United States Patent

Pak et al.

[11] Patent Number: 5,247,791
[45] Date of Patent: Sep. 28, 1993

[54] POWER GENERATION PLANT AND POWER GENERATION METHOD WITHOUT EMISSION OF CARBON DIOXIDE

[75] Inventors: Pyong S. Pak, 10-26, Hiyoshidai, Ichiban-Cho, Takatsuki-shi, Osaka-Fu; Kenichi Nakamura, Kasai; Yutaka Suzuki, 4-5, Sakura 2-chome, Minoo-shi, Osaka-fu, all of Japan

[73] Assignees: Pyong S. Pak, Takatsuki; Yutaka Suzuki, Minoo; Kabushiki Kaisha Toshiba, Kawasaki, all of Japan; a part interest

[21] Appl. No.: 930,339

[22] Filed: Aug. 17, 1992

Related U.S. Application Data

[62] Division of Ser. No. 426,206, Oct. 25, 1989, Pat. No. 5,175,995.

[51] Int. Cl.⁵ .............................................. F02C 6/00
[52] U.S. Cl. ................................. 60/39.182; 60/39.55
[58] Field of Search ............... 60/39.02, 39.05, 39.182, 60/39.19, 39.461, 39.55, 39.52

[56] References Cited

U.S. PATENT DOCUMENTS

| | | | |
|---|---|---|---|
| 2,677,236 | 5/1954 | Grinsted | 60/39.52 |
| 3,134,228 | 5/1964 | Wolansky et al. | 60/39.55 |
| 3,177,659 | 4/1965 | Berman | 60/39.182 |
| 3,204,407 | 9/1965 | Meissenberg et al. | 60/39.182 |
| 3,736,745 | 6/1973 | Karig | 60/39.52 |
| 4,342,192 | 8/1982 | Heyn et al. | 60/39.52 |
| 4,498,259 | 2/1985 | Stohl | 60/39.52 |
| 4,498,289 | 2/1985 | Osgerby | 60/39.52 |
| 4,528,811 | 7/1985 | Stahl | 60/39.52 |
| 4,680,927 | 7/1987 | Cheng | 60/39.55 |
| 4,925,475 | 5/1990 | Maslak | 60/39.05 |

Primary Examiner—Richard A. Bertsch
Assistant Examiner—Timothy S. Thorpe
Attorney, Agent, or Firm—Oblon, Spivak, McClelland, Maier & Neustadt

[57] ABSTRACT

In a closed type thermal power generation plant, the fuel is supplied in the combustor and burnt therein in the presence of oxygen, instead of air. The combustion gas mainly including water and carbon dioxide is delivered from the combustor into the turbine. A turbine exhaust gas is fed into the waste heat boiler to carry out heat exchanging operation therein and an exhaust gas mainly including water component and carbon dioxide from the waste heat boiler is fed into the condenser. The gas component mainly including the carbon dioxide is separated from the condensate in the water-gas separator and may be fed into the combustor in a compressed state, or the separated gas component may be recovered externally to the plant without emitting the same into the atmosphere. The separated condensate is fed into the waste heat boiler to be subjected to heat exchanging operation therein to generate superheated steam which is to be fed into the combustor, or may be recovered externally.

Further, a steam turbine may be connected to the waste heat boiler and generator. A condensor may then be connected to the steam turbine and waste heat boiler so that the steam turbine, condenser and waste heat boiler constitute a closed cycle.

3 Claims, 4 Drawing Sheets

POWER GENERATION PLANT AND POWER GENERATION METHOD WITHOUT EMISSION OF CARBON DIOXIDE

This is a division of application Ser. No. 07/426,206, filed on Oct. 25, 1989, now U.S. Pat. No. 4,175,945.

BACKGROUND OF THE INVENTION

This invention relates to a power generation plant and a power generation method without emission of carbon dioxide and, more particularly, a thermal power generation plant and method of a closed cycle type incorporating a carbon dioxide recovery system.

In a conventional power generation plant, particularly a thermal power generation plant, a steam turbine or gas turbine, or the both are driven by combustion gas energy generated by burning fuel with air in a combustor and the air is also utilized as a working fluid gas compressed in a compressor. In such a thermal power generation plant, natural gas, petroleum fuel gas or coal gas has been utilized for the fuel gas, which generally includes carbon components such as carbon (C), carbon monooxide (CO), or other hydrocarbon (CmHn). Accordingly, the combustion gas after the burning of the fuel in the presence of air includes carbon dioxide ($CO_2$), nitrogen oxide ($NO_x$) and sulpher oxide ($SO_x$) generated by the oxidation of sulfur contained in the fuel in addition to nitrogen gas ($N_2$) and oxygen gas ($O_2$) contained in the air.

The exhaust of the harmful gas such as $NO_x$, $SO_x$ and $CO_2$ in the atmosphere provides a significant problem for an environmental pollution. It is not easy to restrict the generation of $NO_x$ in the combustion gas as far as the fuel gas is burnt in the presence of air in the combustor and, in order to remove the $NO_x$ and $SO_x$, in the conventional power plant, additional equipment is incorporated for the removal thereof in the process of gassification and the following gas refining process. In the meantime, in order to remove the $CO_2$ contained in the gas to be exhausted in the atmosphere after the combustion, it is necessary to remove and recover the $CO_2$ from the exhaust gas before the emission in the atmosphere.

In order to recover the $CO_2$ in the exhaust gas, in the conventional practical method, the $CO_2$ is separated and removed by utilizing a solvent having a property capable of selectively absorbing the $CO_2$ from the exhaust gas at a low temperature. The solvent including highly concentrated $CO_2$ also has a property capable of discharging the $CO_2$ by heating the same, whereby the $CO_2$ can be recovered by heating the solvent including the highly concentrated $CO_2$.

However, the method of recovering the $CO_2$ by utilizing the solvent provides the following problems.

First, the $CO_2$ is recovered in contact of the exhaust gas in the solvent, but the contacting time is limited; that is, it is impossible to infinitely contact the exhaust gas to the solvent during the operation of the thermal power plant and, accordingly, some amount of the $CO_2$ remains unrecovered in the exhaust gas. Second, an extremely voluminous $CO_2$ is usually generated in the thermal power plant, so that the voluminous solvent is also required as well as the heat energy for heating the solvent, which results in the increasing of the cost for the construction of a $CO_2$ recovery system and of the operation cost thereof.

In the other point of view, in the conventional thermal power plant, the air including about 80% of $N_2$ is utilized for burning the fuel and the exhaust gas includes a voluminous highly concentrated $N_2$ gas, so that the total amount of the exhaust gas increases and a large amount of the solvent for recovering the $CO_2$ is required as described above.

SUMMARY OF THE INVENTION

An object of this invention is to substantially eliminate defects or drawbacks encountered to the prior art as described above and to provide an improved power generation plant of closed cycle type incorporating a $CO_2$ recovery system capable of emitting substantially no $NO_x$, $SO_x$ and $CO_2$.

Another object of this invention is to provide a closed dual fluid gas turbine power generation plant in which superheated steam and $CO_2$ are utilized as working fluids for the turbine operation and in which $CO_2$ is substantially not exhausted externally.

A further object of this invention is to provide a closed combined cycle type power generation plant in which $CO_2$ is recycled and utilized as a working fluid for the turbine operation without emitting the same in the atmosphere.

A still further object of this invention is to provide a closed $H_2O$ gas turbine power generation plant in which $H_2O$ is utilized as a working fluid for the turbine operation without emitting the $CO_2$ in the atmosphere.

These and other objects can be achieved according to this invention, in one aspect, by providing a thermal power generation plant of a closed dual fluid gas turbine power generation structure comprising, a combustor in which a fuel is burnt in the presence of an oxygen, a fuel supply means connected to the combustor to supply a fuel therein, an oxygen supply means connected to the combustor to supply an oxygen therein, a turbine operatively connected to the combustor to be driven by combustion gas from said combustor, said turbine exhausting a turbine exhaust gas mainly composed of carbon dioxide and water component, a generator connected to the turbine, a waste heat boiler connected to the turbine, a condenser connected to the waste heat boiler for condensing the water gas component in a cooled exhaust gas from the waste heat boiler, a water-gas separator connected to the condenser for separating condensate and gas component mainly composed of carbon dioxide, the water-gas separator being connected to the waste heat boiler to feed the condensate thereto, the waste heat boiler being connected to the combustor for supplying superheated steam generated in the waste heat boiler due to heat exchanging operation between the condensate and the turbine exhaust gas, and a compressor connected to the water-gas separator for compressing the gas component mainly composed of the carbon dioxide, the compressor being connected to the combustor for supplying compressed carbon dioxide.

In another aspect of this invention, there is provided a thermal power generation plant of a closed combined cycle structure in which, instead of the connection of the water-gas separator to the waste heat boiler as described above with respect to the first aspect of this invention, a steam turbine connected to the generator is further installed in the plant and the steam turbine is connected to the waste heat boiler through a condenser so as to constitute another combined closed cycle.

In a further aspect of this invention, there is provided a thermal power generation plant, in which the compressor in the first aspect of this invention is removed and the gas component mainly including the carbon dioxide separated in the water-gas separator is removed therefrom externally to the plant.

According to this invention, the fuel is supplied in the combustor and burnt therein in the presence of oxygen, instead of air, the combustion gas mainly including water component and carbon dioxide is delivered from the combustor into the turbine. The generator is driven by the driving of the turbine with the combustion gas as a turbine working fluid. A turbine exhaust gas is fed into the waste heat boiler to carry out heat exchanging operation therein and an exhaust gas mainly including water component and carbon dioxide from the waste heat boiler is fed in the condenser. On the way of this process, an $SO_x$ removing means may be incorporated in a line connecting the waste heat boiler and the condenser to remove the $SO_x$. The gas component mainly including the carbon dioxide is separated from the condensate in the water-gas separator and recovered without emitting the same in the atmosphere.

The separated gas component mainly including the carbon dioxide may be fed into the combustor in a compressed state. The separated gas component may be recovered externally to the plant without emitting the same in the atmosphere.

The separated condensate is fed into the waste heat boiler to be subjected to heat exchanging operation therein and generate a superheated steam which is to be fed into the combustor. The separated condensate may be recovered externally to the plant.

DESCRIPTION OF THE PREFERRED EMBODIMENTS

Figure 1:
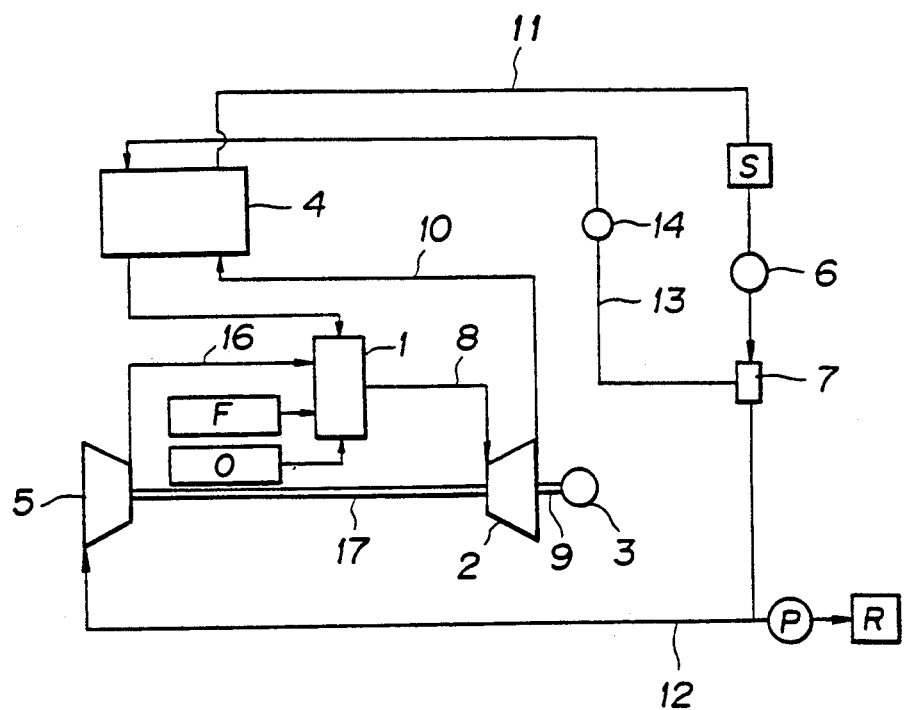
FIG. 1 is a block diagram showing a layout of the first embodiment of a thermal power generation plant of closed dual fluid gas turbine type according to this invention.

FIG. 1 is a block diagram representing the first embodiment of a thermal power plant according to this invention. The thermal power plant generally comprises a combustor 1, a turbine 2, a generator 3, a waste heat boiler 4, a compressor 5, a condenser 6 and a water-gas separator 7, which are operatively connected through duct means respectively to thereby constitute a closed cycle power generation plant.

Referring to FIG. 1, in detail, in the combustor 1, fuel such as coal gas fed from a fuel gas supply means F is burnt in the presence of oxygen fed from an oxygen supply means 0. The combustor 1 is connected to the turbine 2 through a duct 8 and the turbine 2 which is driven by combustion gas from the combustor 1 is connected to the generator 3 through a driving shaft 9. The turbine 2 is also connected to the waste heat boiler 4 to feed exhaust gas after operating the turbine 2 through a duct 10 and the waste heat boiler 4 is connected to the condenser 6 through a duct 11 to feed the exhaust gas therein. The water-gas separator 7 is connected to the condenser 6 to separate fluid from the condenser 6 into gas and condensate. The water-gas separator 7 is connected to the compressor 5 through a duct 12 and the compressor 5 is also connected to the combustor 1 through a duct 10 and to the turbine 2 through a shaft 17. As described above, the power generation plant shown in FIG. 1 constitutes a closed cycle. The water-gas separator 7 is also connected to the waste heat boiler 4 through a duct 13 on the way of which is incorporated a feed water pump 14 to feed the condensate into the waste heat boiler 4 and an excessive carbon oxide removing device including a suction pump P and a reservoir R is operatively connected on the way of the duct 12 connecting the water-gas separator 7 and the compressor 5.

$SO_x$ generated by the oxidation of sulfur which may be contained in the fuel will be preferably removed by incorporating an $SO_x$ removing means, for example a known wet washing type, in the line 11 connecting the waste heat boiler 4 and the condenser 6.

A known oxygen producing means may be utilized as the oxygen supply means for this embodiment, which may produce oxygen from air, without specific technology.

The function of this embodiment will be described hereunder.

The fuel such as coal gas is introduced into the combustor 1 and burnt therein in the presence of the oxygen instead of air. In such combustion process, both the compressed carbon dioxide ($CO_2$) and superheated steam are utilized as working fluids and the $CO_2$ further acts to suppress the excessive burning in the combustor 1. The constituent gases of the combustion gas become $CO_2$ and $H_2O$, since the principal composition of the fuel gas are generally C, CO, $H_2$, $CO_2$, and $C_mH_n$ and which react as follows.

$$C + O_2 \rightarrow CO_2 \tag{1}$$

$$CO + \tfrac{1}{2} O_2 \rightarrow CO_2 \tag{2}$$

$$H_2 + \tfrac{1}{2} O_2 \rightarrow H_2O \tag{3}$$

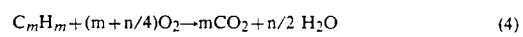
$$C_mH_m + (m + n/4)O_2 \rightarrow mCO_2 + n/2\ H_2O \tag{4}$$

As shown in these equations, the combustion gas substantially includes $CO_2$ and $H_2O$ and, accordingly, an exhaust gas after the combustion gas has been utilized for driving the turbine 2 and an exhaust gas after the turbine exhaust gas has been further utilized in the waste heat boiler 4 substantially include $CO_2$ and $H_2O$. The driving of the turbine 2 is transmitted to the generator 3 through the driving shaft 9 to generate power. The highly heated exhaust gas from the turbine 2 is fed to the waste heat boiler 4 and utilized for heating the condensate due to so-called a heat exchanging operation and the heated condensate, i.e. $H_2O$, is fed into the combustor 1 in form of a superheated steam. The cooled exhaust gas from the waste heat boiler 4 including mainly $CO_2$ and $H_2O$ is thereafter fed to the condenser 6 in which the $H_2O$ component in the exhaust gas is condensed into condensate. In a case where the sulfur component is contained in the fuel, the generated $SO_x$ is removed by the $SO_x$ removing means S incorporated in the duct 11. The condensate and the remaining gas component, generally composed of $CO_x$, are fed into the water separator 7 in which the condensate, i.e. water is separated from the gas component. The water is fed into the waste heat boiler 4 through the duct 13 and the gas component is fed into the compressor 5 through the duct 12. The $CO_2$ fed into the compressor is compressed therein and then fed into the combustor as working fluid for the turbine 2. Although the most part of the $CO_2$ from the water-gas separator 7 is utilized for this purpose, the excessive $CO_2$ generated by the combustion of the fuel will be removed through the removing means including the suction pump P and the reservoir R incorporated on the way of the duct 12.

Further in detail, The combustion gas of high temperature is first used to generate electric power by driving the turbine 2. The exhaust gas which has still a considerable heat energy is then utilized to produce the superheated steam in the waste heat boiler 4 to increase power output as well as to improve the power generation efficiency. The low-temperature gas from the waste heat boiler 4 is thereafter led into the condenser 6, where the water component included in the exhaust gas is substantially completely condensed into water, which is then fed to the waste heat boiler 4 as the feed water.

The principal component of the condenser outlet gas includes $CO_2$, though a small quantity of oxygen and nitrogen is included. Oxygen gas inclusion is caused by injecting excess oxygen into the combustor for realizing complete combustion of the fuel gas and nitrogen gas inclusion is caused by the fact that in general an extremely small quantity of nitrogen gas, which may be neglected, is included in a fuel gas such as coal gas, even if coal is gasified in the presence of the oxygen instead of the air. The gas component from the water separator 7 is recycled as the main working fluid of the gas turbine. The excessive $CO_2$ is recovered by the additional recovery means, so that no $CO_2$ is emitted from the power plant according to this embodiment shown in FIG. 1.

As described above, according to the thermal power plant, so called a closed dual fluid gas turbine power generating plant, of this embodiment, the fuel gas is burnt in the combustor in the presence of the oxygen, instead of the air generally including nitrogen, oxygen or other components, so that substantially no $NO_x$ is contained in the exhaust gas and merely contain $H_2O$ which is utilized as the feed water of the waste heat boiler for producing the superheated steam acting as working fluid and $CO_2$ which is effectively utilized and recycled as the working gas in the power plant. The excessive $CO_2$ generated by, the burning of the fuel is recovered without emitting the $CO_2$ into atmosphere.

Accordingly, the environmental pollution can be substantially eliminated without being equipped with specific means for removing harmful gas such as $NO_x$ and $CO_2$.

A simulation model has been constructed to estimate various characteristics of the power generation plant according to this invention. In this simulation model, the variables and parameters which can be designed in realizing the power generation plant are assumed to be the exogenous variables and parameters, respectively. The detailed explanation of the constructed model is omitted here.

Consequently, it may be ascertained from the simulation results that we can construct a power generation plant without emission of the $CO_2$ into the atmosphere with the power generating efficiency of 43.7%. Although the proposed power generation plant may require the incorporation of the extra equipments for producing oxygen and for liquefying the recovered $CO_2$, this incorporation is not significant in view of the environmental pollution due to the emission of harmful gases such as $NO_x$ and $CO_2$ and of the future utilization of the plant.

Figure 2:
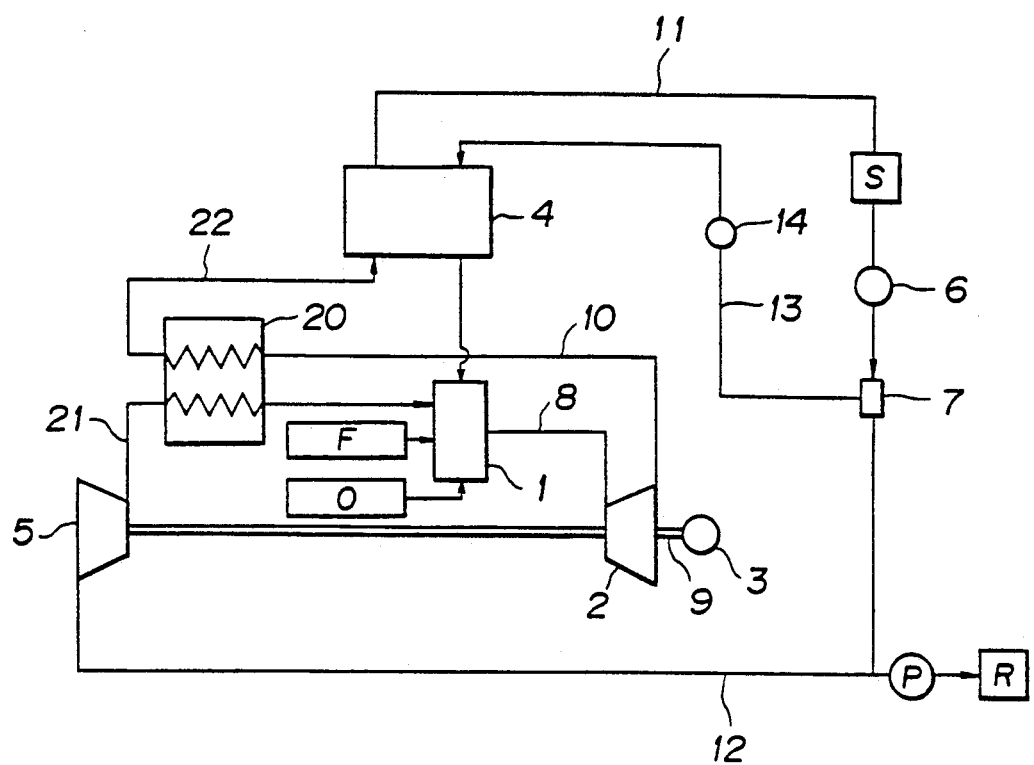
FIG. 2 is a block diagram showing a layout of the second embodiment of a thermal power generation plant of closed dual fluid regenerative gas turbine type according to this invention.

FIG. 2 is a block diagram representing the second embodiment of the thermal power plant according to this invention, which may be called a closed dual fluid regenerative gas turbine power generating plant because of the construction described hereunder.

The thermal power plant represented by FIG. 2 is basically different from that of the first embodiment shown in FIG. 1 in the incorporation of a regenerator designated by reference numeral 20 and the other constructional units or devices are substantially equal to those shown in FIG. 1. Accordingly, the detailed description of the other units or devices are now eliminated by applying the same reference numerals as those described in FIG. 1.

The regenerator 20 is of one kind of a heat exchanger carrying out the heat exchanging operation between the exhaust gas passing the duct 10 connecting the turbine 2 and the waste heat boiler 4 and the compressed carbon oxide passing a duct 21 connecting the $CO_2$ compressor 5 and the combustor 1.

The regenerator 20 operates to recover heat energy from the turbine exhaust gas and the heat energy recovered is utilized to raise the temperature of the main working fluid, i.e. $CO_2$, in this embodiment, from the compressor 5. The incorporation of the regenerator 20 makes it possible to noticiably improve thermal efficiency of the thermal power generating plant.

According to the location of the regenerator 20, the $CO_2$ gas from the compressor 5 is heated by the exhaust gas from the turbine 2 in the regenerator 20 due to the heat exchanging operation therebetween and the highly heated $CO_2$ is then fed into the combustor 1 as the main working fluid. The exhaust gas passing through the regenerator 20 is fed into the waste heat boiler through the duct 22.

As described above, according to the thermal power plant shown in FIG. 2, so called a closed dual fluid regenerative gas turbine power generating plant, of this embodiment, the fuel gas is burnt in the combustor in the presence of the oxygen, instead of the air generally including nitrogen, oxygen or other components, so that substantially no $NO_x$ is contained in the exhaust gas and merely contain $H_2$ which is utilized as the feed water of the waste heat boiler for producing the superheated steam acting as the working fluid and $CO_2$ which is effectively utilized and recycled as the working fluid in the power plant. The $CO_2$ from the compressor 5 the, regenerator 20 due to the heat exchanging operation thereof. The excessive $CO_2$ generated by the combustion of the fuel is recovered without emitting into atmosphere.

$SO_x$ generated by the oxidation of sulfur which may be contained in the fuel will be preferably removed by incorporating an $SO_x$ removing means, for example a known wet washing type, in the line 11 connecting the waste heat boiler 4 and the condenser 6.

Accordingly, the environmental pollution can be substantially eliminated without being equipped with specific means for removing harmful gas such as $NO_x$, $SO_x$ and $CO_2$.

In another aspect of this invention, the principle of the power generation plant of the character shown in FIG. 1 or 2 will be positively adopted to a combined cycle power generation plant.

Figure 3:
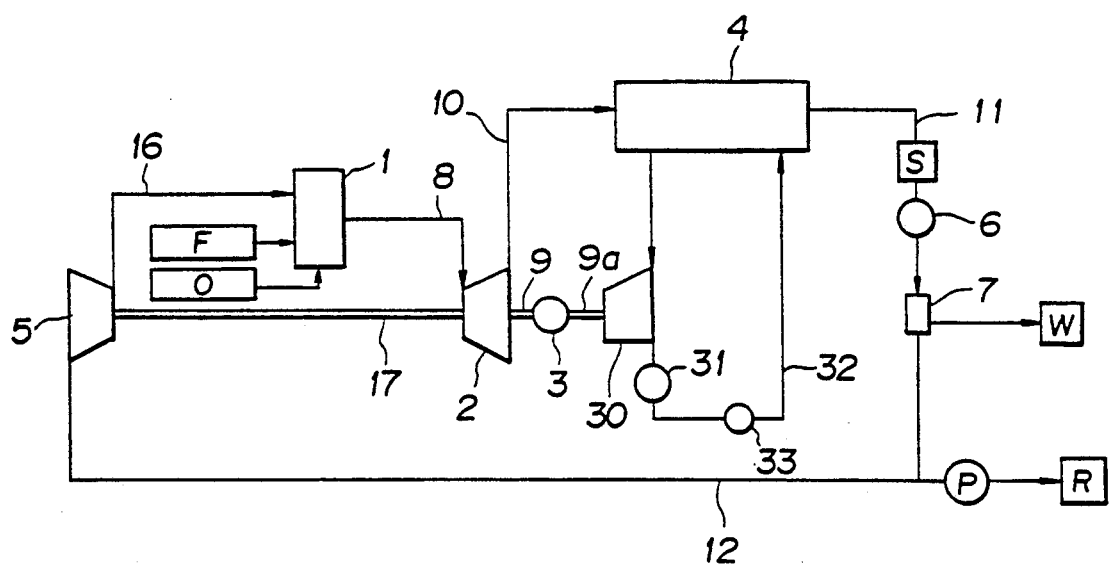
FIG. 3 is a block diagram showing a layout of the third embodiment of a thermal power generation plant of closed combined cycle gas turbine type according to this invention.

FIG. 3 shows a block diagram of the third embodiment of a thermal power generation plant of the combined cycle type according to this invention.

Referring to FIG. 3, in the combustor 1, fuel such as coal gas is burnt in the presence of oxygen. The combustor 1 is connected to the turbine 2 through a duct 8 and the turbine 2 which is driven by combustion gas from the combustor 1 is connected to the generator 3 through a driving shaft 9. The turbine 2 is also connected to the waste heat boiler 4 to feed exhaust gas after operating the turbine 2 through a duct 10 and the waste heat boiler 4 is connected to the condenser 6 through a duct 11 to feed the exhaust gas therein. The water-gas separator 7 is connected to the condenser 6 to separate fluid from the condenser 6 into gas component mainly including the $CO_2$ and condensate. The water-gas separator 7 is connected to the compressor 5 through a duct 12 and the compressor 5 is also connected to the combustor 1 through a duct 16 and to the turbine 2 through a shaft 17. As described above, the power generation plant shown in FIG. 3 constitutes a closed cycle.

In this embodiment, a steam turbine 30 is further located in the power plant and connected to the generator 3 through a driving shaft 9a. The steam turbine 30 is connected to a condenser 31 through a duct and the condenser 31 is also connected to the waste heat boiler 4 through a duct 32. A feed water pump 33 is incorporated on the way of the duct 32. The waste heat boiler 4 is connected to the steam turbine 30, whereby the turbine 30, the condenser 31 and the waste heat boiler 4 constitute a closed cycle through the duct means and, accordingly, the power generation plant shown in FIG. 3 is called as a combined closed type power generation plant.

According to the combined cycle power generation plant shown in FIG. 3, water condensed and stored in the condenser 31 is fed into the waste heat boiler 4 by the actuation of the water feed pump 33 and the water is superheated in the waste heat boiler 4 by the highly heated exhaust gas from the turbine 2 to generate superheated steam through the heat exchanging operation. The superheated steam is then fed to the steam turbine 30 to drive the same and in turn drive the generator 3 through the driving shaft 9a and the steam after utilizing the driving of the steam turbine 30 is conveyed into the condenser 31 to condense the same.

With this embodiment, the condensate separated in the water-gas separator 7 is removed therefrom by a suitable means W of known type and the gas component mainly composed of the $CO_2$ is conveyed into the $CO_2$ compressor 5 through the duct 12 provided on the way thereof with a $CO_2$ gas removing means including the suction pump P and the reservoir R for removing the excessive $CO_2$.

$SO_x$ generated by the oxidation of sulfur which may be contained in the fuel will be preferably removed by incorporating an $SO_x$ removing means, for example a known wet washing type in the line 11 connecting the waste heat boiler 4 and the condenser 6. As described above, according to the thermal power plant shown in FIG. 3, so called a closed combined cycle gas turbine power generating plant, of this embodiment, the fuel gas is burnt in the combustor in the presence of the oxygen, instead of the air generally including nitrogen, oxygen or other components, so that substantially no $NO_x$ is contained in the exhaust gas and $CO_2$ is recycled as the main working gas and an excessive $CO_2$ is recovered without emitting into atmosphere. The highly heated exhaust gas is utilized for the heat exchanging operation in the waste heat boiler 4 for producing the superheated steam for operating the steam turbine 30 which is operatively connected to the generator 3.

Accordingly, the environmental pollution can be substantially eliminated without being equipped with specific means for removing harmful gas such as $NO_x$, $SO_x$ and $CO_2$.

In addition, according to this embodiment, different from a conventional open type power generation plant, the water component in the exhaust gas is condensed, so that the discharge gas pressure can be reduced below the atmospheric pressure and, accordingly, the expansion ratio of the turbine can be made large, which results in the increasing of the turbine power generation efficiency.

Figure 4:
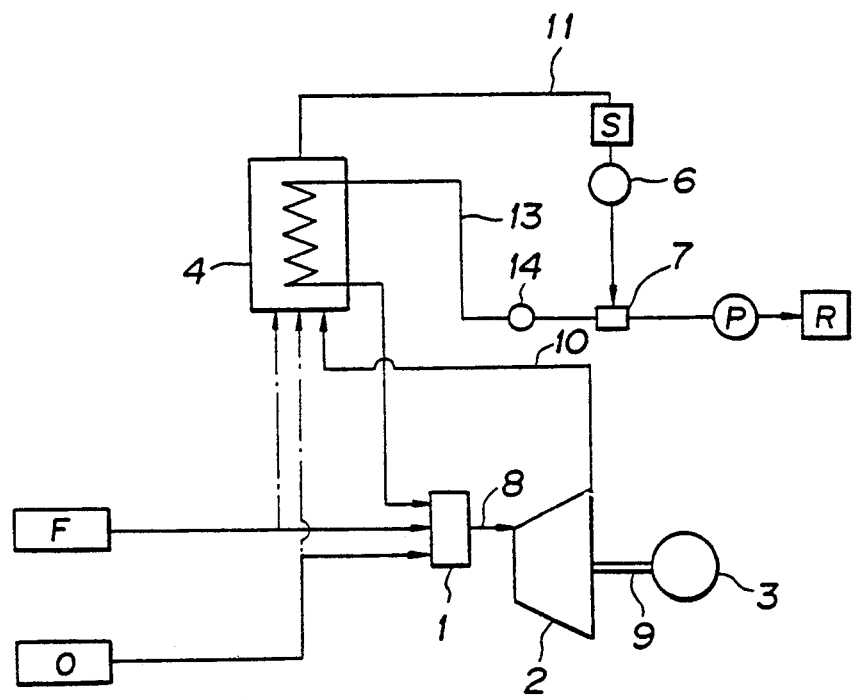
FIG. 4 is a block diagram showing a layout of the fourth embodiment of a thermal power generation plant of closed $H_2O$ gas turbine type according to this invention.

FIG. 4 shows a block diagram representing the fourth embodiment according to this invention and a turbine power generation plant of this invention may be called a closed $H_2O$ gas fluid power generation system for the character described hereunder and, in FIG. 4, like reference numerals are added to elements or units corresponding to those shown in FIG. 1.

With this embodiment, in principle, the line connecting the water-gas separator 7 and the combustor 1 through the compressor for compressing the $CO_2$ is eliminated in comparison with the embodiment shown in FIG. 1. In this meaning, this embodiment may be regarded as a generic embodiment according to this invention.

Namely, the fuel such as coal gas supplied from the fuel supply means F into the combustor 1 is burnt therein in the presence of the oxygen supplied from the oxygen supply means O. The combustion gas from the combustor 1 is delivered to the turbine 2 to drive the same and, hence, the generator 3 through the shaft 9. The exhaust gas from the turbine 2 is fed into the waste heat boiler 4 through a duct 10, in which the heat exchanging operation is carried out between the exhaust gas and the condensate from the condenser 6. The exhaust gas from the condensate waste heat boiler 4 mainly including $H_2O$ and $CO_2$ is delivered into the condenser 6, in which the water component of the exhaust gas is condensed into condensate. The condensate is separated by the water-gas separator 7 from the gas component mainly including the $CO_2$. The condensate is then delivered to the waste heat boiler 4 through the pump means 14 and the $CO_2$ generated by the combustion of the fuel is recovered into a $CO_2$ removing means including the suction pump P and reservoir R installed external to the power generation plant. The condensate in the waste heat boiler 4 is heated into superheated steam which is then fed into the combustor 1 as the working fluid for the turbine.

According to this embodiment, the water component in the exhaust gas is reused effectively as condensate without being discharged exterally to the power generation plant and the superheated steam is utilized as the main working fluid for the turbine instead of the air as is in the conventional plant. Moreover, regarding the exhaust of the harmful gas such as $NO_x$, $SO_x$ and $CO_2$, substantially the same advantages can be attained as those described in the forgoing embodiments.

In this embodiment, the fuel supply means F and the oxygen supply means 0 may be connected to the waste heat boiler 4 so as to assist the heat exchanging operation performed therein.

According to these embodiments of the present invention, $CO_2$ included in the exhaust gas can be recovered by cooling the exhaust gas after the utilization for the power generation without using any solvent for absorbing the $CO_2$. The fuel is burnt in the combustor in the presence of oxygen, not air, thermal $NO_x$ which is caused by the oxidation of $N_2$ included in the air is not formed. Any hydrocarbonic fuel such as liquefied natural gas and fuel oil may be utilized as a fuel as well as coal gas, natural gas or petroleum gas, so that a thermal power generation plant will be realized in view point of long usage of energy source regardless of any variable factor for the fuel. In the embodiment in which $H_2O$ gas is utilized as a working fluid, the temperature of the working fluid can be made high in comparison with a steam turbine power generation plant, so that the power generation with high efficiency can be performed. In the embodiment in which the recovered $CO_2$ is utilized as a working fluid, the water vapor component in the exhaust gas is condensed by cooling the same, so that the discharge pressure from the turbine is made below the atmospheric pressure, different from a conventional gas turbine power generation plant, the power generation efficiency can be made remarkably high.

The thermal power generation plant according to this invention can be realized in combination of the exsisting plant. A known type oxygen producing system can be utilized for the oxygen supply means which is connected to the combustor and a known type $CO_2$ removing means can be incorporated in the plant.

It is to be understood by persons in the art that this invention is not limited to the described embodiment and many changes and modifications may be made according to this invention without departing from the scope of the appended claims.

What is claimed is:

1. A thermal power generation plant of a closed combined cycle structure comprising:
   a combustor in which a fuel is burnt in the presence of an oxygen;
   a fuel supply means connected to said combustor to supply a fuel therein;
   an oxygen supply means connected to said combustor to supply an oxygen therein;
   a turbine operatively connected to said combustor to be driven by combustion gas from said combustor;
   a generator operatively connected to said turbine;
   a waste heat boiler connected to said turbine which exhausts turbine exhaust gas mainly composed of carbon dioxide and water component;
   a condenser connected to said waste heat boiler through a line for condensing the water component in a cooled exhaust gas from said waste heat boiler, a sulfur oxide removing means being incorporated in the line connecting said waste heat boiler and said condenser;
   a water-gas separator connected to said condenser for separating condensate and gas component mainly composed of carbon dioxide, said water-gas separator being connected to said waste heat boiler to feed the condensate thereto;
   a compressor connected to said water-gas separator through a line for receiving said gas component mainly composed of the carbon dioxide and for compressing said gas component and supplying it directly to said combustor;
   a steam turbine connected to said waste heat boiler and connected to said generator through a driving shaft; and
   a condensor connected to said steam turbine and said waste heat boiler through a line through which said stream turbine, said condenser and said waste heat boiler constitute a closed cycle.

2. A power generation plant according to claim 1, wherein an excessive carbon dioxide removing means is incorporated in a line connecting said water-gas separator and said compressor.

3. A power generation plant according to claim 1, wherein a condensate recovery means is connected to said water-gas separator.

* * * * *